(12) United States Patent
Ikeda et al.

(10) Patent No.: US 9,321,177 B2
(45) Date of Patent: Apr. 26, 2016

(54) REDUCER ABNORMALITY DETERMINATION METHOD, ABNORMALITY DETERMINATION DEVICE, AND ROBOT SYSTEM

(75) Inventors: Koichiro Ikeda, Fukuoka (JP); Mitsuaki Nakanishi, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 794 days.

(21) Appl. No.: 13/233,472

(22) Filed: Sep. 15, 2011

(65) Prior Publication Data

US 2012/0065781 A1    Mar. 15, 2012

(30) Foreign Application Priority Data

Sep. 15, 2010 (JP) .................. 2010-206320

(51) Int. Cl.
G05B 15/00 (2006.01)
B25J 9/16 (2006.01)
G05B 19/4065 (2006.01)

(52) U.S. Cl.
CPC ........... *B25J 9/1674* (2013.01); *G05B 19/4065* (2013.01); *G05B 2219/37252* (2013.01);
(Continued)

(58) Field of Classification Search
CPC ........... G05B 2219/37434; G05B 2219/37435; G05B 2219/37525; G05B 2219/37535; G05B 2219/39194; G05B 2219/39261; G05B 2219/41001; G05B 2219/41121; G05B 2219/41152
USPC ................ 700/245, 246, 250, 260, 261, 262; 901/2, 9, 11, 19, 23, 25, 28, 32, 34; 318/563–566, 568.1, 568.11, 568.12, 318/568.18, 568.21, 568.24; 702/41, 702/183–185
See application file for complete search history.

(56) References Cited

U.S. PATENT DOCUMENTS 4,943,759 A * 7/1990 Sakamoto .............. B25J 9/1633
                                                          318/434
5,493,192 A * 2/1996 Nihei .................... B23K 11/252
                                                          318/432

(Continued)

FOREIGN PATENT DOCUMENTS

EP    0321579    6/1989
EP    0566741    10/1993

(Continued)

OTHER PUBLICATIONS

Chinese Office Action for corresponding CN Application No. 201110265517.X, Jan. 26, 2014.

(Continued)

*Primary Examiner* — Thomas G Black
*Assistant Examiner* — Ce Li
(74) *Attorney, Agent, or Firm* — Mori & Ward, LLP

(57) ABSTRACT

The invention provides a method and a device capable of precisely and simply extracting data used for abnormality determination and life diagnosis of a drive system of an industrial robot while executing a normal action program. Regarding a torque signal Tf outputted from a motor driver for controlling a motor in accordance with a position command Xs generated based on an operation program of a robot to the motor, a highpass filter is applied after gravity compensating torque and interference torque due to other shafts of the robot are removed from the torque signal Tf, and an abnormality in a reducer is determined based on an extracted oscillating component of the reducer.

5 Claims, 3 Drawing Sheets

(52) U.S. Cl.
CPC ............... *G05B2219/37434* (2013.01); *G05B 2219/37525* (2013.01); *G05B 2219/39194* (2013.01); *G05B 2219/39261* (2013.01); *G05B 2219/41121* (2013.01); *G05B 2219/41152* (2013.01)

(56) References Cited

U.S. PATENT DOCUMENTS

| | | | | |
|---|---|---|---|---|
| 5,587,635 | A * | 12/1996 | Watanabe et al. | 318/434 |
| 5,857,166 | A * | 1/1999 | Kim | 702/179 |
| 6,384,560 | B1 * | 5/2002 | Kakino et al. | 318/566 |
| 6,785,584 | B2 * | 8/2004 | Yoshikawa | 700/114 |
| 6,892,110 | B2 * | 5/2005 | Inoue et al. | 700/175 |
| 7,092,786 | B2 * | 8/2006 | Yasugi et al. | 700/174 |
| 7,559,405 | B2 * | 7/2009 | Kumaido et al. | 180/446 |
| 7,715,992 | B2 * | 5/2010 | Kashio et al. | 702/34 |
| 8,423,189 | B2 * | 4/2013 | Nakanishi et al. | 700/255 |
| 2003/0163286 | A1 * | 8/2003 | Yasugi | 702/185 |
| 2003/0171895 | A1 * | 9/2003 | Harris et al. | 702/183 |
| 2004/0174130 | A1 * | 9/2004 | Inoue et al. | 318/569 |
| 2008/0133176 | A1 * | 6/2008 | Kashio et al. | 702/183 |
| 2010/0145515 | A1 * | 6/2010 | Nakanishi et al. | 700/255 |
| 2011/0054680 | A1 * | 3/2011 | Nakata et al. | 700/245 |

FOREIGN PATENT DOCUMENTS

| | | |
|---|---|---|
| EP | 2168728 | 3/2010 |
| JP | 63-123105 | 5/1988 |
| JP | 04-242406 | 8/1992 |
| JP | 11-320477 | 11/1999 |
| JP | 2001-051721 | 2/2001 |
| JP | 2005-148873 | 6/2005 |
| JP | 2006-102889 | 4/2006 |
| JP | 2006-102889 A * | 4/2006 |
| JP | 2007-172150 | 7/2007 |
| WO | WO 2009/142006 | 11/2009 |

OTHER PUBLICATIONS

Japanese Office Action for corresponding JP Application No. 2010-206320, Jul. 31, 2012.
Korean Office Action for corresponding KR Application No. 10-2011-0092533, Sep. 19, 2014.
Extended European Search Report for corresponding EP Application No. 11180435.7—1807, Jul. 3, 2014.

* cited by examiner

ACCELERATION OF OTHER SHAFTS

REDUCER ABNORMALITY DETERMINATION METHOD, ABNORMALITY DETERMINATION DEVICE, AND ROBOT SYSTEM

CROSS-REFERENCE TO RELATED APPLICATIONS

The present application claims priority under 35 U.S.C. §119 to Japanese Patent Application No. 2010-206320 filed Sep. 15, 2010. The contents of this application are incorporated herein by reference in their entirety.

BACKGROUND OF THE INVENTION

1. Field of the Invention

The present invention relates to an abnormality determination method and an abnormality determination device of a reducer provided between a load and a motor, the reducer for transmitting torque of the motor to the load.

2. Description of the Related Art

Generally, in a multi-joint type industrial robot, mechanical power of a motor serving as a drive source of joint shafts is transmitted to the joint shafts via a reducer.

By drive of the joint shafts formed in such a way, various end effectors attached to front ends of the robot are moved to predetermined positions. In such an industrial robot, by performing a regular maintenance action to a drive system in particular, a smooth operation can be maintained.

Japanese Unexamined Patent Publication No. 1988-123105 discloses a robot breakdown prediction and diagnosis method characterized in that, by actuating a robot by a reference operation pattern in a normal state of the robot, reference data regarding robot constituent elements at this time is stored, the robot is operated for a desired time and then actuated by the same reference operation pattern again, data regarding the robot constituent elements at this time and the reference data are compared to each other, and breakdown of the robot is predicted and diagnosed based on this comparison result.

SUMMARY OF THE INVENTION

According to one aspect of the present invention, in a reducer abnormality determination method for determining an abnormality in a reducer for amplifying torque generated by a motor and transmitting the torque, the reducer being attached to the motor serving as a drive source for joint shafts of a multi-joint robot, the reducer for transmitting the torque of the motor to an arm of the robot, regarding a torque signal outputted from a motor driver for controlling the motor in accordance with a position command generated based on an operation program of the robot to the motor, a highpass filter is applied after gravity compensating torque and interference torque due to other shafts of the robot are removed from the torque signal, and the abnormality in the reducer is determined based on an extracted oscillating component of the reducer.

According to another aspect of the present invention, in a reducer abnormality determination device for determining an abnormality in a reducer for amplifying torque generated by a motor and transmitting the torque, the reducer being attached to the motor serving as a drive source for joint shafts of a multi-joint robot, the reducer for transmitting the torque of the motor to an arm of the robot, regarding a torque signal outputted from a motor driver for controlling the motor in accordance with a position command generated based on an operation program of the robot to the motor, a highpass filter is applied after gravity compensating torque and interference torque due to other shafts of the robot are removed from the torque signal, and the abnormality in the reducer is determined based on an extracted oscillating component of the reducer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
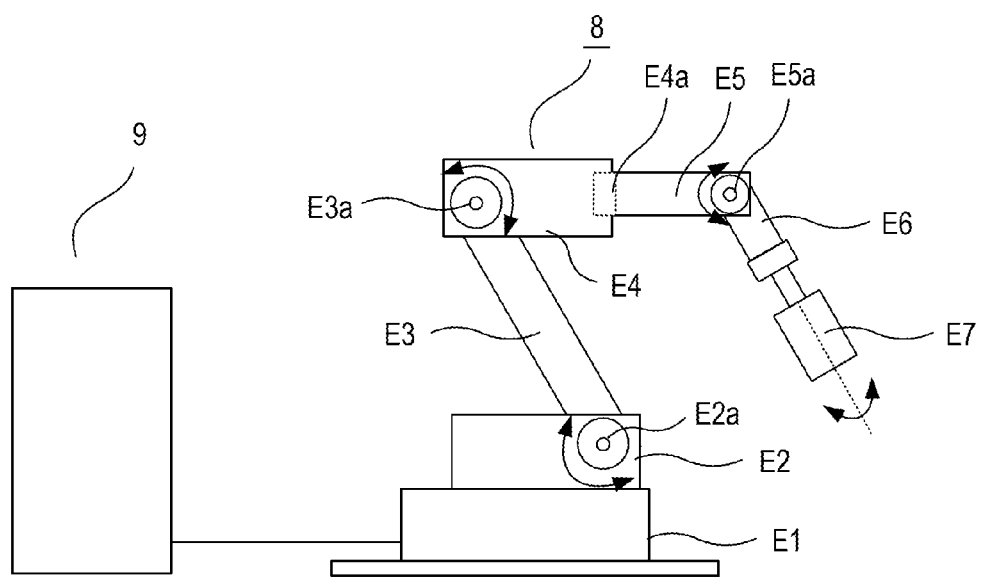
FIG. 1 is a side view of a robot according to an embodiment of the present invention.

Embodiments will now be described with reference to the accompanying drawings, wherein like reference numerals designate corresponding or identical elements throughout the various drawings.

In FIG. 1, reference numeral 8 denotes a robot, and reference numeral 9 denotes a robot controller for controlling the robot 8.

The robot 8 is provided with six joint shafts, and a rotation base E2 is rotatably arranged on an upper surface of a fixed base E1. The rotation base E2 is rotatably supported on a rotation shaft (not shown) vertically standing on the fixed base E1. One end of a long lower arm E3 is pivotably supported on a shaft E2a in a top part of the rotation base E2.

One end of an upper arm base E4 is pivotably supported on a shaft E3a in the other end of the lower arm E3. The shaft E2a and the shaft E3a respectively provided in both the ends of the lower arm E3 are parallel to each other, and both the shafts E2a, E3a are orthogonal to the rotation shaft (not shown) rotatably supporting the rotation base E2 on the fixed base E1 at distant positions.

One end of an upper arm front end E5 is pivotably supported on a shaft E4a in a front end of a straight part of the upper arm base E4 on the opposite side of the lower arm E3. The shaft E3a and the shaft E4a respectively provided in both the ends of the upper arm base E4 are orthogonal to each other at distant positions. A rear end of a wrist E6 is pivotably supported on a shaft E5a in the other end of the upper arm front end E5. The shaft E4a and the shaft E5a respectively provided in both the ends of the upper arm front end E5 are orthogonal to each other at distant positions. An end effector E7 is rotatably supported on a rotation shaft shown by a broken line in a front end of the wrist E6. This rotation shaft supporting the end effector E7 is orthogonal to the shaft E5a.

The shafts of the robot in FIG. 1 are driven by rotation type motors.

Reducer drive devices (not shown) are respectively provided in joint parts or rotation parts between the fixed base E1 and the rotation base E2, between the rotation base E2 and the lower arm E3, between the lower arm E3 and the upper arm base E4, between the upper arm base E4 and the upper arm front end E5, between the upper arm front end E5 and the wrist E6, and between the wrist E6 and the end effector E7.

Figure 2:
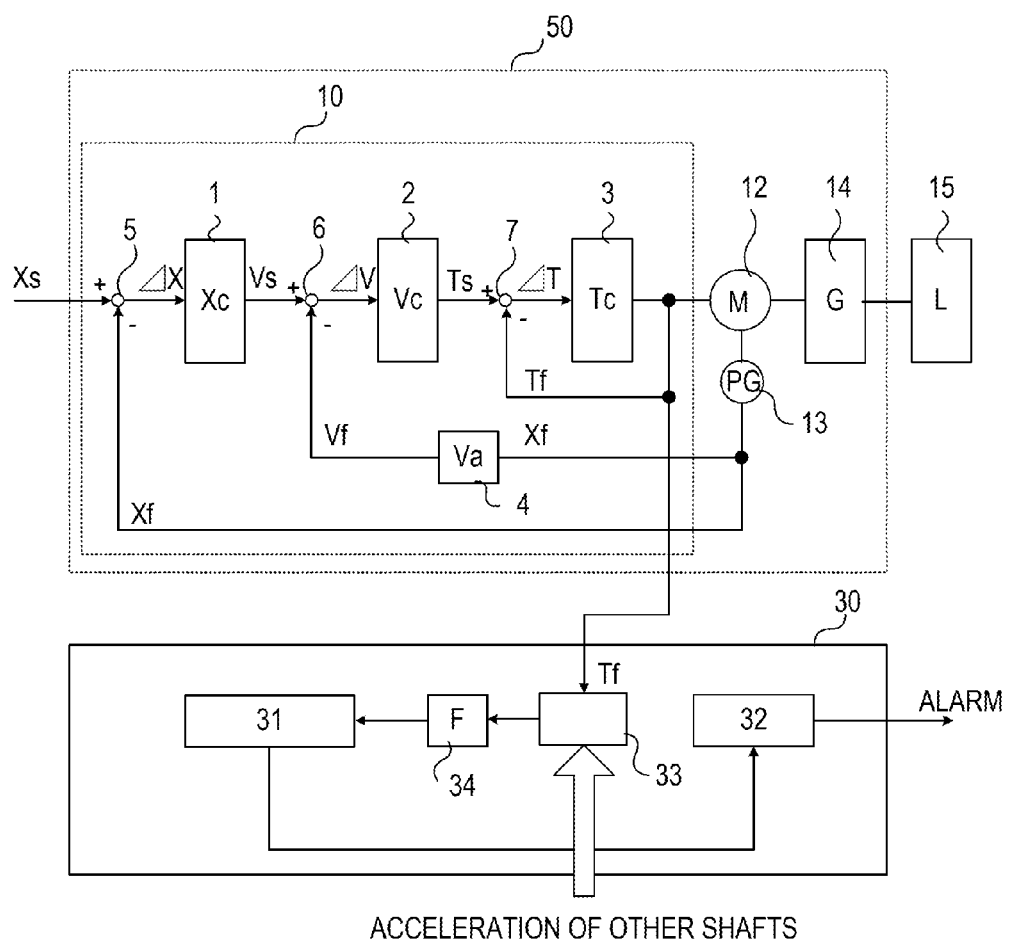
FIG. 2 is a block diagram of an abnormality determination device according to the embodiment of the present invention, and peripheral devices thereof.

FIG. 2 is a block diagram of a reducer drive device 50 and an abnormality determination device 30 regarding one shaft among the joint drive shafts of the robot shown in FIG. 1. In FIG. 2, the reducer drive device 50 is an object to be determined by the abnormality determination device 30.

The reducer drive device 50 has a motor 12 for driving a load 15, a reducer 14 provided between the load 15 and the motor 12, the reducer for reducing the rotation number given from the motor 12 so as to increase torque and transmit a rotation drive force of the motor 12 to the load 15, a position detector 13 serving as a detector for detecting a rotation operation of the motor 12, and a motor driver 10 for controlling the motor 12 based on a feedback signal outputted by the position detector 13.

When the reducer drive device 50 provided between the fixed base E1 and the rotation base E2 is taken as an example, the load 15 corresponds to the rotation base E2 rotated and driven relative to the fixed base E1. When the reducer drive device 50 provided between the lower arm E3 and the upper arm base E4 is taken as an example, the load 15 corresponds to the upper arm base E4 driven to be oscillated within a predetermined angle range relative to the lower arm E3.

In the present embodiment, among the elements shown in FIG. 2, the motor 12, the position detector 13, the reducer 14, and the load 15 are arranged in the robot, and the motor driver 10 and the abnormality determination device 30 are arranged in the robot controller.

The motor driver 10 has a position controller 1, a speed controller 2, a current amplifier 3, a speed converter 4, and three adders 5, 6, 7. A position command value Xs inputted from a command unit (not shown) in the robot controller 9 to the motor driver 10 is outputted from the position controller 1 as a speed command Vs after position control is performed by the position controller 1 and the adder 5. The speed command Vs is outputted from the speed controller 2 as a torque command Ts after speed control is performed by the speed controller 2 and the adder 6.

Further, this torque command Ts is outputted from the current amplifier 3 as a drive current to be inputted to the motor 12 after torque (current) control is performed by the current amplifier 3 and the adder 7.

It should be noted that the torque command Ts inputted to the current amplifier 3 and a torque signal Tf fedback to this torque command Ts are both current values. However, in the present embodiment, since these current values are used to indicate magnitude of torque of the motor 12, the term "torque" is used.

Meanwhile, rotation motion of the motor 12 is detected by the position detector 13. A position detection value outputted by the position detector 13 is fedback as a position feedback signal Xf and added to the command value Xs from the command unit by the adder 5 so as to correct the command value Xs. The position detection value outputted by the position detector 13 is converted into a speed detection value Vf by the speed converter 4, fedback as a speed feedback signal Vf, and added to the speed command Vs outputted from the position controller 1 by the adder 6 so as to correct the speed command Vs.

The torque signal (detection value) Tf outputted from the current amplifier 3 is fedback as a torque feedback signal Tf and added to the torque command Ts from the speed controller 2 by the adder 7 so as to correct the torque command Ts.

The abnormality determination device 30 takes the torque detection value Tf obtained from the motor driver 10 as an input. Abnormality determination of the reducer is performed in an abnormality determinator 31. In a case where it is determined that the reducer is abnormal, an alarm is outputted to the outside by an alarm 32. After corrected in a torque data corrector 33, the torque detection value Tf is filtered in a highpass filter 34 and inputted to the abnormality determinator 31. The abnormality determinator 31 performs the abnormality determination of the reducer based on an output of the highpass filter.

Figure 3:
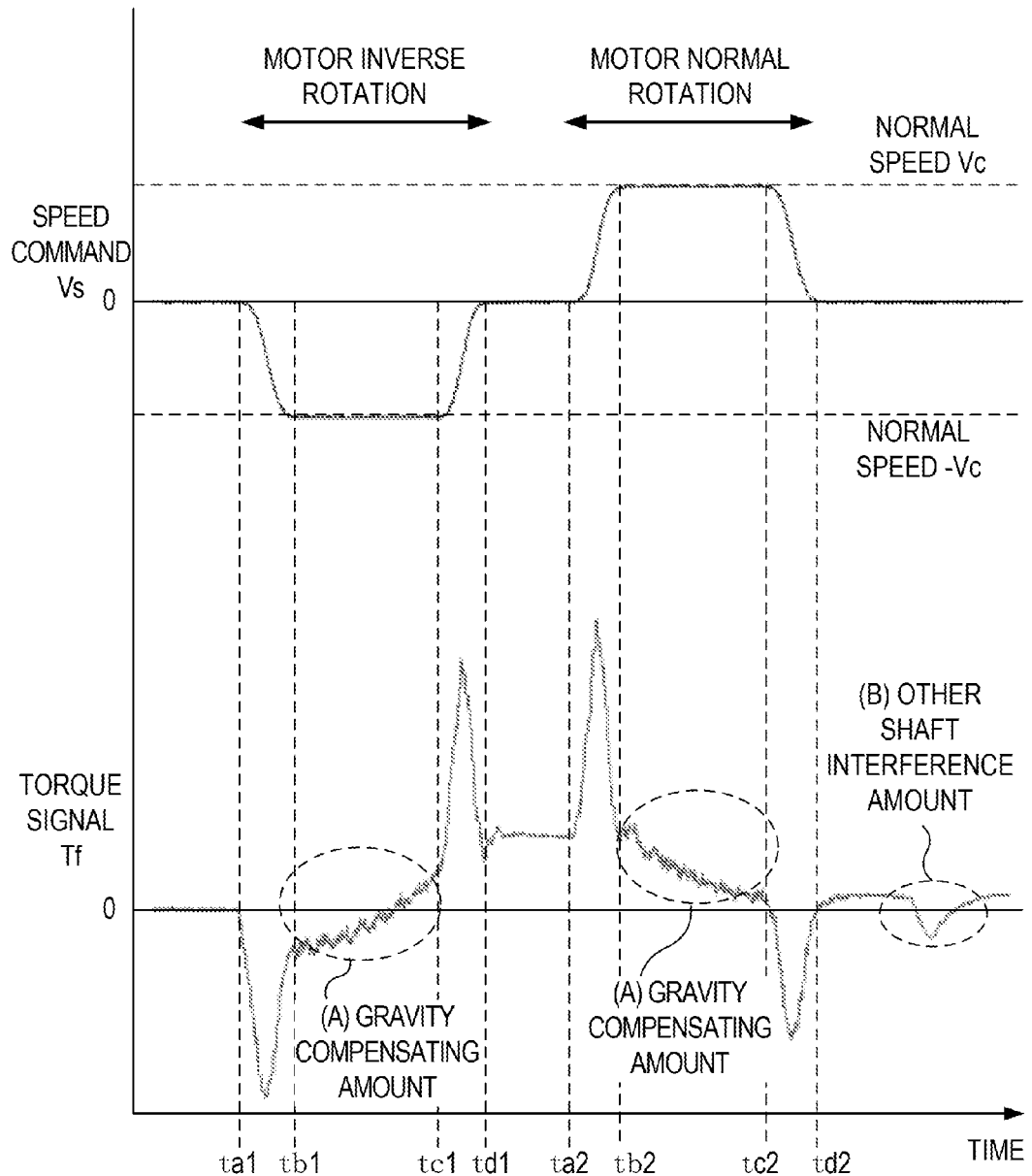
FIG. 3 is a waveform diagram showing a state of changes in a speed command Vs and a torque signal Tf.

FIG. 3 is a diagram for illustrating an abnormality determination method of the reducer by the abnormality determination device 30, with a horizontal axis indicating time, showing a state of changes in the speed command (Vs) and the torque signal (Tf).

In the present embodiment, without operating the robot by an exclusive operation program for the abnormality determination, the abnormality determination can be performed while the robot is operated by an operation program (action program) for actions normally performed by the robot. The action program is preliminarily instructed, and recorded in a nonvolatile storage device (not shown) in the robot controller 9.

FIG. 3 extracts part of operations by the action program of the robot and shows the speed command and the torque signal in a case where the motor 12 is firstly inversely rotated at normal speed Vc and then normally rotated at the same normal speed Vc, and returned to an original position. As an example of the motor 12, a shaft influenced by gravity in accordance with the operation such as the shaft E3a and the shaft E5a of the robot shown in FIG. 1 is assumed.

A movement command to the robot is performed by the position command Xs to command a target destination position. It should be noted that a way of giving the destination position includes two types of an absolute position command by an absolute position and an increment position command by a relative movement amount from a current position. However, any one of the types may be used in the case of the present embodiment.

Supposing that the command unit commands the position command value Xs (reverse rotation) to the motor driver 10 at a time point ta1 in FIG. 3, and then commands the position command value Xs (normal rotation) again at a time point ta2.

When the position command is received, the motor 12 starts rotating, and an absolute value of speed is gradually increased. When the speed reaches predetermined speed (normal speed Vc) (at a time point tb1 or a time point tb2 in the figure), the speed is maintained. Thereafter, the robot goes forward so as to come close to the target position (destination position Xs). When the robot comes to a position which is a predetermined distance away from and in front of the target position (at a time point tc1 or a time point tc2 in the figure), the speed is gradually decreased. When the robot reaches the target position (Xs), the speed is controlled to be just zero (at a time point td1 or a time point td2 in the figure).

A value of the torque signal Tf in a case where such control is performed is largely changed at the time of acceleration of the motor 12 (between ta1 and tb1 and between ta2 and tb2) and at the time of deceleration (between tc1 and td1 and between tc2 and td2). However, a change in the value is relatively small in a state of the normal speed Vc (between tb1 and tc1 and between tb2 and tc2).

During such an operation, an oscillating component inherent to the reducer 14 connected to the motor 12 is added to the torque signal Tf. When the reducer 14 is abnormal, the oscillating component thereof becomes extremely large. It is generally known that the oscillating component thereof is gradually increased in an aging deterioration process of the reducer 14. Therefore, by observing the torque signal Tf during the operation of the robot, an abnormality in the reducer 14 connected to the motor 12 can be detected.

Thus, in the abnormality determination device 30, after the torque signal Tf is corrected in the torque data corrector 33, the torque signal is filtered in the highpass filter 34. In a case where a result thereof meets abnormality conditions described below, it is determined that the reducer 14 is abnormal. In a case where the abnormality determination device 30 determines that the reducer 14 is abnormal as described above, the alarm is outputted to the outside via the alarm 32.

A correction method in the torque data corrector 33 will be described.

As is clear from a waveform of the torque signal in FIG. 3, there are many cases where the torque does not come close to zero even in a normal speed region (between tb1 and tc1 and between tb2 and tc2 in FIG. 3) unlike FIG. 3 of Japanese Unexamined Patent Publication No. 2007-172150.

This is because the motor always receives an influence of the gravity imposed on the load 15. In order to have a state that the torque comes close to zero, the rotation shaft direction of the motor has to be parallel to the vertical direction (gravity direction). However, taking the robot shown in FIG. 1 as an example, it is hard to think that the shafts such as E2a, E3a, E4a, E5a continuously take such a posture.

That is, the influence of the gravity imposed on the load is added to the torque signal Tf regarding these shafts. This influence received from the gravity is indicated as a gravity compensating amount in FIG. 3.

Further, as shown by (B) in FIG. 3, irrespective of whether the shaft is driven or not, by operating the load positioned on the robot front end side of the shaft (including the motor 12, the reducer 14, the load 15, and the like on the front side of the shaft), upon receiving an influence of the operation, torque serving as an interference force is generated and added to the torque signal Tf. In FIG. 3, this is indicated as other shaft interference force. It should be noted that FIG. 3 shows a state that interference from other shafts is generated during non-operation of the motor 12 so that a state of the other shaft interference force being added can be easily understood.

That is, in order to stably extract torque data for the abnormality determination, the torque of the gravity compensating amount and the torque generated by the other shaft interference force have to be firstly removed from the data of the torque signal.

The interference force from other shafts imposed onto one shaft among the plurality of shafts of the vertical multi-joint type robot can be determined as the sum of "(coupling inertia respectively from other shafts)×(acceleration of shaft)" relative to one shaft to be targeted.

Taking a first shaft (shaft between the fixed base E1 and the rotation base E2 in FIG. 1) of the robot 8 serving as a six-shaft robot as an example, the interference force from other shafts is determined as follows.

Interference torque to first shaft =

(coupling inertia from second shaft × acceleration of second shaft) +

(coupling inertia from third shaft × acceleration of third shaft) +

(coupling inertia from fourth shaft × acceleration of fourth shaft) +

(coupling inertia from fifth shaft × acceleration of fifth shaft) +

(coupling inertia from sixth shaft × acceleration of sixth shaft)

That is, from dynamics model calculation of the robot, the acceleration and the coupling inertia of the second to sixth shafts are determined as needed, and these are multiplied and added together, so that the interference torque to the first shaft can be determined.

At the time of collecting the torque data, the torque generated by the other shaft interference at that time point is determined as above, and taken away from the data of the torque signal, so that the torque data suitable for the abnormality determination can be obtained.

The torque of the gravity compensating amount to one shaft of the robot can also be obtained from the dynamics model calculation of the robot as needed.

Taking the shaft E3a as an example, with consideration for link weight of the shafts, postures and lengths of arms on the end effector side of the shaft E3a, and further, weight and size of the end effector, gravitational moment imposed on rotation center of the shaft E3a in a certain posture during the operation is determined. This gravitational moment is torque in the gravity direction imposed on the shaft E3a. Thus, by taking an amount of this torque away from the data of the torque signal, the torque data suitable for the abnormality determination can be obtained.

A calculation method of the gravitational moment imposed on the rotation center of the shaft E3a is as follows.

Taking the weight of the shafts of the robot and the end effector as "link end weight", from the postures and the lengths of the arms and the weight and the size of the end effector, a distance from a working point of the "link end weight" to the rotation center of the shaft E3a is determined.

Gravitational moment=Distance from rotation center to working point×gravity on mass point center The above elements are applied in the following expression and calculated.

Gravitational moment imposed on shaft $E3a$ =

(gravitational moment received from third shaft arm ($E3$)) +

(gravitational moment received from fourth shaft arm ($E4$)) +

(gravitational moment received from fifth shaft arm ($E5$)) +

(gravitational moment received from sixth shaft arm ($E6$)) +

(gravitational moment received from end effector ($E7$))

As well as the interference force, the torque generated by this gravity compensating amount is taken away from the data of the torque signal, and the data is inputted to the highpass filter 34.

The above is the processing performed in the torque data corrector 33.

In the abnormality determination of the reducer, the torque oscillating component serving as a material of determination is a component having a relatively high frequency from the reducer. The highpass filter 34 cuts a gentle current change in accordance with a posture change of the robot from the torque signal, and lets only the component having a high frequency pass through. An optimal cut-off frequency of the highpass filter is varied due to size of the robot or a difference between the reducer drive devices of the shafts. However, the cut-off frequency is a value approximately from several Hz to several tens of Hz.

The oscillating component measured at the time of generating the abnormality in the reducer 14 has a high frequency, and thus passes through the highpass filter 34. As a result, the high-frequency oscillating component of the reducer 14 is more remarkably indicated than other signals. Thus, the oscillating component of the reducer 14 to be detected is more easily monitored, so that the abnormality determination can be performed with higher precision.

Further, only a component having a large amplitude frequency may be extracted, and the abnormality determination may be performed from magnitude of a signal level thereof, so that the abnormality determination can be performed with higher precision.

In the highpass filter, each time when an order is added, a component of a frequency to be extracted is slightly damped. That is, in order to remove an unnecessary torque component for the abnormality determination while keeping the torque component to be extracted as far as possible, it is effective to parameterize the cut-off frequency and the order for the highpass filter so as to adjust each of objects to be monitored.

The abnormality determination device 30 may be realized by a CPU of the controller 9 or can be provided outside the controller 9 as well as a personal computer and the like connected to the controller 9.

Conditions of the abnormality determination will be shown.

A result of initial measurement is stored, and an allowable change range is determined from the initial result and set as a threshold value. A method for determining the abnormality in a case where a last measurement result exceeds the threshold value is adopted.

(1) Within an arbitrary fixed time period, absolute values of the torque signal Tf after processing by the highpass filter 34 are collected.

(2) An average value is determined from the collected data of the torque signal Tf and set as a torque oscillating component Tave.

(3) Initial measurement is performed at the time of shipping of the robot or the like, and an average value Ti of torque oscillating components at that time is recorded in a storage device.

(4) Current measured value of torque Tave−Initial measured value Ti>Threshold value Vsh When the above conditions are met, it is determined that the reducer is abnormal.

It should be noted that the threshold value Vsh is a torque change upper limit allowable value which is preliminarily set.

The alarm generated from the alarm 32 may take an appropriate form such as a buzzer alarm, a display on an operation panel, a voice announcement, and lighting of a red light. Alternatively, the alarm may be a notification signal to a system management room or a system management device.

Since the abnormality determination device 30 of the reducer in such a configuration has the abnormality determinator 31 for taking the torque detection value Tf detected from the motor 12 as an input and performing abnormality determination processing of the reducer 14, the abnormality in the reducer can be determined with a simple configuration and with high reliability.

Further, since the abnormality determination device has the alarm 32 for outputting the alarm to the outside based on an abnormality determination output of the abnormality determinator 31, the abnormality determination device can notify people nearby such as an operator and staff in the system management room, so as to promptly respond to the abnormality.

It should be noted that although the abnormality determination of the motor 12 for driving the joints in the multi-joint type industrial robot is described in the present embodiment, the present invention is not limited thereto. The abnormality determination device of the present embodiment can be applied to a servo control device having the motor 12, the reducer 14, and the motor driver 10 as a device for determining the abnormality in the reducer 14 of this servo control device.

What is claimed as new and is desired to be secured by Letters Patent of the United States is:

1. A reducer abnormality determination method for determining an abnormality in a reducer for amplifying torque generated by a motor and transmitting the torque, the reducer being attached to the motor serving as a drive source for joint shafts of a multi joint robot, the reducer for transmitting the torque of the motor to an arm of the robot, the method comprising:

removing gravity compensating torque and interference torque due to other shafts of the robot from a torque signal outputted from a motor driver for controlling the motor in accordance with a position command generated based on an operation program of the robot to the motor;

applying a highpass filter after the gravity compensating torque and the interference torque due to the other shafts of the robot are removed from the torque signal;

collecting absolute values of the torque signal processed by the highpass filter during a specific period of time defined within a period of time from a timing at which the motor starts rotating via a predetermined steady speed to a timing at which the motor stops;

obtaining an average value of the absolute values collected during the specific period of time; and determining that the reducer corresponding to the motor is abnormal when a difference between an initial average value of absolute values of the torque of the motor obtained at a time of shipping of the multi joint robot and a latest value of the average value is larger than a preliminary set threshold value in order to perform life diagnosis of the multi-joint robot, wherein both the initial average value and the latest value are determined by operating the robot using an action program including movement commands including speed commands and position commands to control movement of the robot to perform actions normally performed by the robot.

2. The reducer abnormality determination method according to claim 1, wherein a cut-off frequency of the highpass filter is changeable.

3. A reducer abnormality determination device for determining an abnormality in a reducer for amplifying torque generated by a motor and transmitting the torque, the reducer being attached to the motor serving as a drive source for joint shafts of a multi joint robot, the reducer for transmitting the torque of the motor to an arm of the robot, the reducer abnormality determination device comprising:

a torque data corrector configured to remove gravity compensating torque and interference torque due to other shafts of the robot from a torque signal outputted from a motor driver for controlling the motor in accordance with a position command generated based on an operation program of the robot to the motor;

a highpass filter is applied after the gravity compensating torque and the interference torque due to the other shafts of the robot are removed from the torque signal; and an abnormality determinator programmed to:

collect absolute values of the torque signal processed by the highpass filter during a specific period of time defined within a period of time from a timing at which the motor starts rotating via a predetermined steady speed to a timing at which the motor stops;

obtain an average value of the absolute values collected during the specific period of time; and determine that the reducer corresponding to the motor is abnormal when a difference between an initial average value of absolute values of the torque of the motor obtained at a time of shipping of the multi joint robot and a latest value of the average value is larger than a preliminary set threshold value in order to perform life diagnosis of the multi-joint robot, wherein both the initial average value and the latest value are determined by operating the robot using an action program including movement commands including speed commands and position commands to control movement of the robot to perform actions normally performed by the robot.

4. The reducer abnormality determination device according to claim 3, wherein a cut-off frequency of the highpass filter is changeable.

5. A robot system comprising:
a robot control device provided with the reducer abnormality determination device according to claim 3; and
a robot controlled by the robot control device.

* * * * *